United States Patent
Kazuno (10) Patent No.: US 11,738,662 B2
(45) Date of Patent: Aug. 29, 2023

(54) BATTERY INFORMATION PROVIDING DEVICE, BATTERY INFORMATION PROVIDING SYSTEM, BATTERY INFORMATION PROVIDING METHOD, AND RECORDING MEDIUM

(71) Applicant: HONDA MOTOR CO., LTD., Tokyo (JP)

(72) Inventor: Shuichi Kazuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 16/952,112

(22) Filed: Nov. 19, 2020

(65) Prior Publication Data

US 2021/0188115 A1    Jun. 24, 2021

(30) Foreign Application Priority Data

Dec. 23, 2019  (JP) .................................. 2019-231884

(51) Int. Cl.
*B60L 58/12* (2019.01)
*B60L 58/16* (2019.01)

(52) U.S. Cl.
CPC .............. *B60L 58/12* (2019.02); *B60L 58/16* (2019.02); *B60L 2240/72* (2013.01); *B60L 2250/16* (2013.01)

(58) Field of Classification Search
CPC ...... B60L 58/12; B60L 58/16; B60L 2240/72; B60L 2250/16
See application file for complete search history.

(56) References Cited

U.S. PATENT DOCUMENTS

2018/0019598 A1*  1/2018  Tsuchiya ................. H02J 9/061

FOREIGN PATENT DOCUMENTS

| JP | 2004-085574 | 3/2004 |
| JP | 2005-137034 | 5/2005 |
| JP | 2010-126126 | 6/2010 |
| JP | 2012-073740 | 4/2012 |
| JP | 2012073740 | * 4/2012 |
| JP | 2012-228074 | 11/2012 |

(Continued)

OTHER PUBLICATIONS

JP2012073740 MT (Year: 2012).*

(Continued)

*Primary Examiner* — Alexander Usyatinsky
(74) *Attorney, Agent, or Firm* — Amin, Turocy & Watson, LLP (57) ABSTRACT

A battery information providing device includes an acquisition part configured to acquire a battery charging rate of a battery, which is mounted on a vehicle and which stores electric power for traveling the vehicle, and device battery information related to a device battery which is included in a device, which is an object to which the electric power is supplied, connected to the vehicle, and an estimation part configured to estimate a state of the battery after the electric power stored in the battery has been supplied to the device battery on the basis of the battery charging rate and the device battery information, and configured to output battery-related information related to the estimated state of the battery to an information output part.

12 Claims, 6 Drawing Sheets

(56) References Cited

FOREIGN PATENT DOCUMENTS

| JP | 2013-099124 |   | 5/2013 |
|----|-------------|---|--------|
| JP | 5362930     | * | 7/2013 |
| JP | 2014-026387 |   | 2/2014 |
| JP | 2004085574  | * | 3/2014 |
| JP | 2015-027217 |   | 2/2015 |
| JP | 2018-011435 |   | 1/2018 |

OTHER PUBLICATIONS

JP 2004085574 MT (Year: 2004).*
JP2013099124 MT (Year: 2013).*
2019231884,Decision_to_Grant_a_Patent_(Translated),dated May 10, 2022 (Year: 2023).*
JP 5362930 MT (Year: 2013).*
Japanese Office Action for Japanese Patent Application No. 2019-231884 dated Oct. 12, 2021.

* cited by examiner

BATTERY INFORMATION PROVIDING DEVICE, BATTERY INFORMATION PROVIDING SYSTEM, BATTERY INFORMATION PROVIDING METHOD, AND RECORDING MEDIUM

CROSS-REFERENCE TO RELATED APPLICATION

Priority is claimed on Japanese Patent Application No. 2019-231884, filed Dec. 23, 2019, the content of which is incorporated herein by reference.

BACKGROUND OF THE INVENTION

Field of the Invention

The present invention relates to a battery information providing device, a battery information providing system, a battery information providing method, and a recording medium.

Description of Related Art

In recent years, development of a vehicle that travels using an electric motor driven by electric power supplied from at least a battery (a secondary battery), for example, an electric vehicle (EV: an electric automobile), a hybrid electric vehicle (HEV: a hybrid electric automobile), or the like, has been in progress.

In the related art, a technology of supplying electric power stored in a battery mounted in a vehicle to another device is disclosed (for example, see Japanese Unexamined Patent Application, First Publication No. 2005-137034 and Japanese Unexamined Patent Application, First Publication No. 2013-099124). In addition, a technology of monitoring a state of a battery mounted in a vehicle is disclosed (for example, see Japanese Unexamined Patent Application, First Publication No. 2010-126126).

SUMMARY OF THE INVENTION

When the electric power stored in a battery mounted in a vehicle is supplied to another device, in order to prevent hindrance in traveling or the like of the vehicle, for example, it is important to ascertain a state of the battery such as a capacity or the like with respect to the electric power able to be stored in the battery. However, in the technology in the related art, sufficient consideration has not been given to ascertaining the state of the battery after supply of power to another device, or the like.

An aspect of the present invention is directed to providing a battery information providing device, a battery information providing system, a battery information providing method, and a recording medium in which a state of a battery after supply of electric power stored in the battery mounted in a vehicle to another device is able to be ascertained.

A battery information providing device, a battery information providing system, a battery information providing method, and a recording medium according to the present invention employ the following configurations.

(1) A battery information providing device according to an aspect of the present invention includes an acquisition part configured to acquire a battery charging rate of a battery, which is mounted on a vehicle and which stores electric power for traveling the vehicle, and device battery information related to a device battery which is included in a device, which is an object to which the electric power is supplied, connected to the vehicle; and an estimation part configured to estimate a state of the battery after the electric power stored in the battery has been supplied to the device battery on the basis of the battery charging rate and the device battery information, and configured to output battery-related information related to the estimated state of the battery to an information output part.

(2) In the aspect of the above-mentioned (1), the estimation part may estimate a battery charging rate of the battery after the electric power has been supplied to the device battery as the state of the battery.

(3) In the aspect of the above-mentioned (1) or (2), the estimation part may output a traveling distance, which is a distance over which the vehicle is able to travel after the electric power has been supplied to the device battery, to the information output part as the battery-related information.

(4) In the aspect of any one of the above-mentioned (1) to (3), the estimation part may output a usable time, which is a time length in which an in-vehicle device included in the vehicle is usable after the electric power has been supplied to the device battery, to the information output part as the battery-related information.

(5) In the aspect of any one of the above-mentioned (1) to (4), the estimation part may output an electric power suppliable time, which is a time length over which the electric power stored in the battery is able to be supplied to an outside of the vehicle after the electric power has been supplied to the device battery, to the information output part as the battery-related information.

(6) In the aspect of any one of the above-mentioned (1) to (5), the acquisition part may acquire information related to a capacity of the device battery as the device battery information.

(7) In the aspect of the above-mentioned (6), the acquisition part may acquire information related to a battery charging rate of the device battery as the device battery information.

(8) In the aspect of the above-mentioned (6) or (7), the acquisition part may acquire information related to a deterioration state of the device battery as the device battery information.

(9) In the aspect of any one of the above-mentioned (1) to (8), the acquisition part may acquire the device battery information that has been input to the information input part.

(10) In the aspect of any one of the above-mentioned (1) to (8), the acquisition part may acquire the device battery information which has been transmitted from a battery management server device that is configured to manage a usage of the battery in the vehicle.

(11) In the aspect of any one of (1) to (8), the acquisition part may acquire the device battery information transmitted from the device which is the object to be supplied with the electric power.

(12) In the aspect of any one of the above-mentioned (1) to (8), the acquisition part may acquire the device battery information transmitted from a device management server device configured to manage the device battery information transmitted from the device which is the object to be supplied with the electric power.

(13) In addition, a battery information providing system according to an aspect of the present invention includes the battery information providing device according to the aspect of any one of the above-mentioned (1) to (9), and a battery management server device configured to manage a usage of the battery in the vehicle, wherein the battery management server device transmits the acquired device battery information to the battery information providing device, and the battery information providing device estimates a state of the battery after the electric power stored in the battery has been supplied to the device battery on the basis of the battery charging rate and the device battery information transmitted from the battery management server device, and outputs the battery-related information related to the estimated state of the battery to the information output part.

(14) In the aspect of the above-mentioned (13), the battery management server device may transmit the device battery information, which is acquired from the device management server device configured to manage the device battery information transmitted from the device which is the object to be supplied with the electric power, to the battery information providing device.

(15) In addition, a battery information providing method according to an aspect of the present invention, which is performed by a computer, includes acquiring a battery charging rate of a battery, which is mounted on a vehicle and which stores electric power for traveling the vehicle, and device battery information related to a device battery which is included in a device, which is an object to which the electric power is supplied, connected to the vehicle; estimating a state of the battery after the electric power stored in the battery has been supplied to the device battery on the basis of the battery charging rate and the device battery information; and outputting battery-related information related to the estimated state of the battery to an information output part.

(16) In addition, there is a recording medium according to an aspect of the present invention, on which a program is stored to cause a computer to: acquire a battery charging rate of a battery, which is mounted on a vehicle and which stores electric power for traveling the vehicle, and device battery information related to a device battery which is included in a device, which is an object to which the electric power is supplied, connected to the vehicle; estimate a state of the battery after the electric power stored in the battery has been supplied to the device battery on the basis of the battery charging rate and the device battery information; and output battery-related information related to the estimated state of the battery to an information output part.

According to the aspects of the above-mentioned (1) to (16), it is possible to perceive a state of a battery after electric power stored in the battery mounted in the vehicle has been supplied to another device.

DETAILED DESCRIPTION OF THE INVENTION

Hereinafter, embodiments of a battery information providing device, a battery information providing system, a battery information providing method, and a program of the present invention will be described with reference to the accompanying drawings. In the following description, an example of the case in which the battery information providing device of the present invention is employed in an electric automobile (EV) (hereinafter, simply referred to as "a vehicle") will be described.

First Embodiment

[Configuration of Vehicle in which Battery Information Providing Device is Employed]

Figure 1:
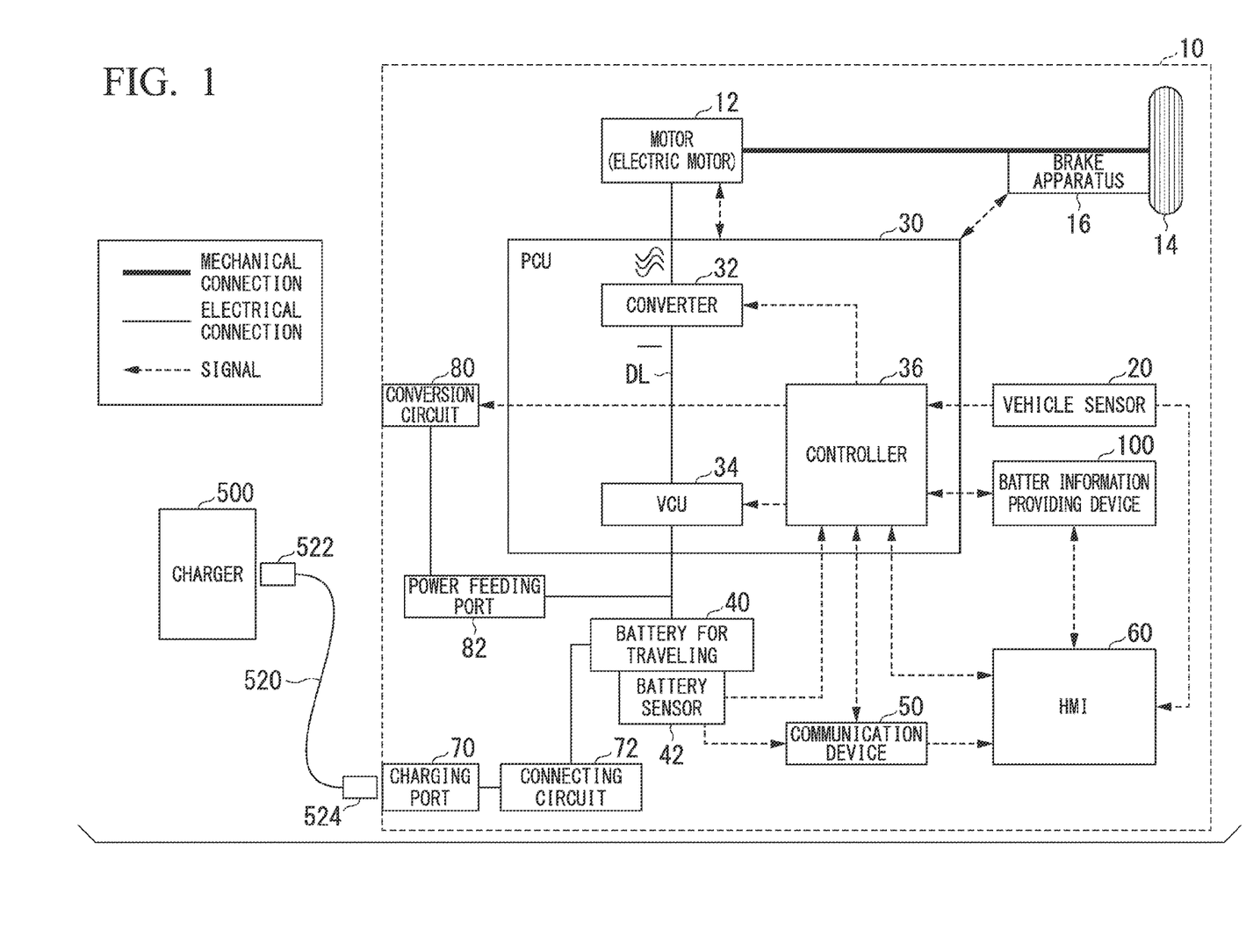
FIG. 1 is a view showing an example of a configuration of a vehicle in which a battery information providing device according to a first embodiment is adopted.

FIG. 1 is a view showing an example of a configuration of a vehicle 10 in which a battery information providing device 100 according to a first embodiment is employed. The vehicle 10 shown in FIG. 1 is a battery electric vehicle (BEV: an electric automobile) that travels using an electric motor driven by electric power supplied from a battery (a secondary battery) for traveling. Further, the vehicle 10 includes, in addition to a four-wheeled vehicle, for example, a saddle type two-wheeled vehicle, or a three-wheeled vehicle (including a two-front-wheeled and one-rear-wheeled vehicle in addition to a one-front-wheeled and two-rear-wheeled vehicle), and further, all vehicles that travel through an operation of an internal combustion engine or an electric motor driven by electric power supplied from a battery, for example, an assist type bicycle or the like.

The vehicle 10 shown in FIG. 1 includes, for example, a motor 12, a driving wheel 14, a brake apparatus 16, a vehicle sensor 20, a power control unit (PCU) 30, a battery 40 for traveling, a battery sensor 42 such as a voltage sensor, a current sensor, a temperature sensor, and the like, a communication device 50, a human machine interface (HMI) 60 including a display device, a charging port 70, a connecting circuit 72, a power feeding port 80, a conversion circuit 82, and the battery information providing device 100.

The motor 12 is, for example, a 3-phase alternating current electric motor. A rotator (a rotor) of the motor 12 is connected to the driving wheel 14. The motor 12 is driven by electric power supplied from a power storage part (not shown) included in the battery 40 for traveling, and a rotating force is transmitted to the driving wheel 14. In addition, the motor 12 generates power using kinetic energy of the vehicle 10 upon deceleration of the vehicle 10.

The brake apparatus 16 may include, for example, a brake caliper, a cylinder configured to transmit a hydraulic pressure to the brake caliper and an electric motor configured to generate a hydraulic pressure in the cylinder. The brake apparatus 16 may include a mechanism configured to transmit the hydraulic pressure generated by an operation by a user (a driver) of the vehicle 10 with respect to a brake pedal (not shown) to the cylinder via a master cylinder as a backup. Further, the brake apparatus 16 is not limited to the above-mentioned configuration, and may be an electronically controlled hydraulic brake apparatus configured to transmit a hydraulic pressure of a master cylinder to a cylinder.

The vehicle sensor 20 includes, for example, an accelerator position sensor, a vehicle speed sensor, and a brake depression amount sensor. The accelerator position sensor is attached to an accelerator pedal, detects an amount of operation of the accelerator pedal by a driver, and outputs the detected operation amount to a controller 36 included in the PCU 30 as an accelerator position. The vehicle speed sensor includes, for example, wheel speed sensors attached to wheels of the vehicle 10 and a speed calculator, derives a speed of the vehicle 10 (a vehicle speed) by combining the wheel speeds detected by the wheel speed sensors, and outputs the derived speed to the controller 36 and the HMI 60. The brake pedaling sensor is attached to the brake pedal, detects an amount of operation of the brake pedal by the driver, and outputs the detected operation amount to the controller 36 as a brake depression amount.

The PCU 30 includes, for example, a converter 32, a voltage control unit (VCU) 34, and the controller 36. Further, in FIG. 1, the configuration in which these components are grouped together as the PCU 30 is just an example, and those components in the vehicle 10 may be arranged in a distributed manner.

The converter 32 is, for example, an AC-DC converter. A DC-side terminal of the converter 32 is connected to a DC link DL. The battery 40 for traveling is connected to the DC link DL via the VCU 34. The converter 32 converts alternating current generated by the motor 12 into direct current, and outputs the converted direct current to the DC link DL.

The VCU 34 is, for example, a DC-DC converter. The VCU 34 boosts electric power supplied from the battery 40 for traveling, and outputs the boosted electric power to the DC link DL.

The controller 36 includes, for example, a motor controller, a brake controller, a battery/VCU controller, and an electric power feeding controller. The motor controller, the brake controller, the battery/VCU controller, and the electric power feeding controller may be replaced with separate control devices, for example, control devices referred to as a motor electronic control unit (ECU), a brake ECU, a battery ECU, and an electric power feeding control ECU.

In addition, the controller 36, or the motor controller, the brake controller, the battery/VCU, the controller and the electric power feeding controller that are included in the controller 36 are realized by executing a program (software) using a hardware processor such as a central processing unit (CPU) or the like. In addition, some or all of these components may be realized by hardware (a circuit part; including circuitry) such as a large scale integration (LSI), an application specific integrated circuit (ASIC), a field-programmable gate array (FPGA), a graphics processing unit (GPU), or the like, or may be realized by cooperation of software and hardware. In addition, some or all of functions of these components may be realized by a dedicated LSI. The program may have been previously stored in a storage device such as a hard disk drive (HDD), a flash memory, or the like, included in the vehicle 10 (a storage device including a non-transient recording medium), or may be stored in a detachable recording medium (a non-transient recording medium) such as a DVD, a CD-ROM, or the like, and installed on an HDD or flash memory included in the vehicle 10 by a recording medium being mounted on a drive device included in the vehicle 10.

The motor controller of the controller 36 controls driving of the motor 12 on the basis of the output from the accelerator position sensor included in the vehicle sensor 20. The brake controller of the controller 36 controls the brake apparatus 16 on the basis of the output from the brake pedaling sensor included in the vehicle sensor 20. The battery/VCU controller of the controller 36 calculates, for example, a state of charge (SOC; hereinafter, referred to as "a battery charging rate") of the battery 40 for traveling on the basis of the output from the battery sensor 42 connected to the battery 40 for traveling, and outputs the SOC to the VCU 34, the HMI 60, and the battery information providing device 100. The controller 36 may output information of the vehicle speed output from the vehicle sensor 20 to the HMI 60. The VCU 34 increases a voltage of the DC link DL according to an instruction from the battery/VCU controller.

The electric power feeding controller of the controller 36 performs control when electric power stored in the battery 40 for traveling is supplied as electric power to charge, for example, a battery included in another device (hereinafter, referred to as "a device battery") connected to the vehicle 10. The other device is a terminal device such as a smartphone, a tablet terminal, or the like, held by, for example, a user in the vehicle 10 (an occupant such as a driver or the like). In addition, the other device may be an apparatus or a device such as a laptop computer (what is called a notebook PC), a portable external battery (an apparatus, what is called, a portable power supply device), or the like. Further, the other device may be another vehicle different from the vehicle 10.

The battery 40 for traveling is a secondary battery capable of repeating charging and discharge, for example, a lithium ion battery or the like. As the secondary battery that constitutes the battery 40 for traveling, in addition to a lead storage battery, a nickel hydride battery, a sodium ion battery, or the like, for example, a capacitor such as an electric dual layer capacitor or the like, a compound battery obtained by combining a secondary battery and capacitor, or the like, are also conceivable. Further, in the present invention, the configuration of the secondary battery in the battery 40 for traveling is not particularly defined. In addition, the battery 40 for traveling may be, for example, a cassette type battery pack or the like detachably mounted in the vehicle 10. The battery 40 for traveling stores electric power introduced from a charger 500 outside the vehicle 10, and performs discharge for traveling of the vehicle 10.

The battery sensor 42 detects a physical quantity such as a current, a voltage, a temperature, or the like, of the battery 40 for traveling. The battery sensor 42 includes, for example, a current sensor, a voltage sensor, and a temperature sensor. The battery sensor 42 detects the current of the secondary battery (hereinafter, simply referred to as "the battery 40 for traveling") that constitutes the battery 40 for traveling using the current sensor, detects the voltage of the battery 40 for traveling using the voltage sensor, and detects the temperature of the battery 40 for traveling using the temperature sensor. The battery sensor 42 outputs information such as the current value, the voltage value, the temperature, and the like, of the battery 40 for traveling, which are detected, to the controller 36 or the communication device 50.

The communication device 50 includes a wireless module configured to connect to a cellular network or a Wi-Fi network. The communication device 50 may include a wireless module configured to use Bluetooth (a registered trademark) or the like. For example, the communication device 50 transmits or receives various types of information related to the vehicle 10 to/from the above-mentioned server device (hereinafter, referred to as "a battery management server device") on the network (not shown) that manages a state of the battery 40 for traveling mounted in the vehicle 10 through communication in the wireless module.

The HMI 60 provides various types of information to a user of the vehicle 10, for example, a driver or the like, and receives an input operation of the user. The HMI 60 is, for example, a so-called touch panel in which a display device such as a liquid crystal display (LCD) or the like and an input device configured to detect an input operation are combined. The HMI 60 may include various types of display parts other than the display device, a speaker, a buzzer, switches other than the input device, a key, and the like. The HMI 60 may share the display device or the input device with a display device or an input device such as, for example, an in-vehicle navigation device or the like.

The charging port 70 is a mechanism configured to charge the battery 40 for traveling (the secondary battery). The charging port 70 is oriented toward the outside from the vehicle body of the vehicle 10. The charging port 70 is connected to the charger 500 via a charging cable 520. The charging cable 520 includes a first plug 522 and a second plug 524. The first plug 522 is connected to the charger 500, and the second plug 524 is connected to the charging port 70. Electricity supplied from the charger 500 is input (supplied) to the charging port 70 via the charging cable 520.

In addition, the charging cable 520 includes a signal cable attached to the electric power cable. The signal cable mediates communication between the vehicle 10 and the charger 500. Accordingly, an electric power connector configured to connect to the electric power cable and a signal connector configured to connect to the signal cable are provided on the first plug 522 and the second plug 524.

The connecting circuit 72 is provided between the charging port 70 and the battery 40 for traveling. The connecting circuit 72 transmits current introduced from the charger 500 via the charging port 70, for example, direct current as current that is supplied to the battery 40 for traveling. The connecting circuit 72 outputs, for example, the direct current to the battery 40 for traveling, and stores (charges) electric power in the battery 40 for traveling (the secondary battery).

The power feeding port 80 is a mechanism (a connecting terminal) configured to feed electric power stored in the battery 40 for traveling to the outside of the vehicle 10. Another device configured to receive electric power from the battery 40 for traveling is connected to the power feeding port 80. As the connecting terminal of the power feeding port 80, for example, an accessory socket (what is called a cigarette lighter port) for supply of electric power, a universal serial bus (USB) terminal, or the like, installed in a passenger compartment of the vehicle 10 is conceivable. In addition, the connecting terminal of the power feeding port 80 is, for example, a socket or the like of a commercial power supply configured to operate domestic electric appliances or a personal computer. In the power feeding port 80, a plurality of connecting terminals having the same shape or connecting terminals having different shapes may be provided. In this case, in the vehicle 10, electric power can be supplied from the battery 40 for traveling to a plurality of other devices connected simultaneously. In addition, the power feeding port 80 may share the mechanism configured to connect to the other vehicle with the mechanism of the charging port 70, for example, when electric power is supplied from the battery 40 for traveling to the other vehicle different from the vehicle 10.

The conversion circuit 82 is provided between the power feeding port 80 and the battery 40 for traveling. The conversion circuit 82 is, for example, a DC-DC converter or a DC-AC converter. The conversion circuit 82 converts electric power (a voltage) output from the battery 40 for traveling to the outside of the vehicle 10 into electric power (a voltage) defined in a shape of each connecting terminal of the power feeding port 80. In other words, the conversion circuit 82 converts the electric power into electric power (a voltage) that coincides with a specification of the device connected to the connecting terminal and outputs the converted electric power to the power feeding port 80. Accordingly, for example, when the connecting terminal of the power feeding port 80 is a USB terminal, electric power can be supplied to charge the device battery included in the terminal device such as a smart phone, a tablet terminal, or the like, carried by a user (an occupant such as a driver or the like) of the vehicle 10. In addition, for example, when the connecting terminal of the power feeding port 80 is the socket of a commercial power supply, electric power can be supplied to charge the device battery included in the apparatus or a device such as a notebook PC, a portable power supply device, or the like, carried by the user of the vehicle 10. Further, in the conversion circuit 82, in the case in which electric power is supplied from the battery 40 for traveling to another vehicle different from the vehicle 10, when the mechanism of the power feeding port 80 is shared by the mechanism of the charging port 70, the electric power (the voltage) converted into the electric power (the voltage) that coincides with the specification of the other vehicle is output to the charging port 70.

The battery information providing device 100 previously (before the electric power is supplied to the device battery) calculates (estimates) the battery information related to the state of the battery 40 for traveling (hereinafter, referred to as "battery-related information") after the electric power has been supplied to the device battery when the electric power stored in the battery 40 for traveling is supplied to the device battery. The battery-related information is, for example, the SOC of the battery 40 for traveling (a battery charging rate) after the electric power has been supplied to the device battery. In addition, the battery-related information may include details of various types related to the state of the battery 40 for traveling after the electric power has been supplied to the device battery, for example, a distance over which the vehicle 10 can travel in a state in which it has the SOC of the battery 40 for traveling after electric power has been supplied to the device battery (a traveling distance) or the like. In the following description, the battery information providing device 100 will be mainly described as calculating (estimating) the SOC of the battery 40 for traveling after the electric power has been supplied to the device battery.

The battery information providing device 100 or the components included in the battery information providing device 100 are realized by executing a program (software) using a hardware processor such as a CPU or the like. In addition, some or all of these components may be realized by hardware (a circuit part; including circuitry) such as an LSI, an ASIC, an FPGA, a GPU, or the like, or may be realized by cooperation of software and hardware. In addition, some or all of functions of these components may be realized by a dedicated LSI. The program may be previously stored in a storage device such as an HDD, a flash memory, or the like, included in the vehicle 10 (a storage device including a non-transient recording medium), or may be stored in a detachable recording medium (a non-transient recording medium) such as a DVD, a CD-ROM, or the like, and installed on an HDD or a flash memory included in the vehicle 10 by the recording medium being mounted on a drive device included in the vehicle 10.

Further, the battery information providing device 100 may be included in (built into), for example, the PCU 30 or the controller 36.

The battery information providing device 100 acquires the current SOC of the battery 40 for traveling from the controller 36 when the SOC of the battery 40 for traveling after the electric power has been supplied to the device battery is previously calculated (estimated). In addition, the battery information providing device 100 acquires battery information related to the device battery included in the other device connected to the vehicle 10 (hereinafter, referred to as "device battery information") from the HMI 60. The device battery information is information used when the device battery is charged, for example, a rated value such as an electric power capacity or the like of the device battery, the current SOC of the device battery, or the like. In addition, the device battery information may include information showing, for example, a deterioration state of the device battery.

The HMI 60 acquires the device battery information input by the operation of the input device by the user of the vehicle 10 and related to the device battery included in the other device connected to the vehicle 10, and outputs the acquired information to the battery information providing device 100. The user of the vehicle 10 inputs information, for example, a value such as an electric power capacity or the like written on a rated nameplate or the like attached to the device battery included in the other device, a battery residual value displayed on the display device included in the other device, or the like. In addition, for example, the user of the vehicle 10 may input the information of the electric power capacity of the device battery retrieved using the Internet. The HMI 60 is an example of "the information input part" in the claims.

The battery information providing device 100 calculates the SOC of the battery 40 for traveling that expresses the electric power quantity remaining after the stored electric power has been charged to the device battery (hereinafter, referred to as "the SOC after supply of the electric power") on the basis of the current SOC acquired of the battery 40 for traveling (hereinafter, "the SOC before supply of the electric power") and the device battery information of the device battery. The battery information providing device 100 outputs the SOC of the battery 40 for traveling after the calculated electric power has been supplied to the device battery (the SOC after supply of the electric power) to the HMI 60, and informs (notifies) the user of the vehicle 10 such as a driver or the like of information of the SOC after supply of the electric power.

The HMI 60 informs (notifies) the user of the vehicle 10 of the SOC of the battery 40 for traveling after charge of the device battery included in the other device connected to the vehicle 10 by displaying the information showing the SOC after supply of the electric power output from the battery information providing device 100 on the display device. Then, when a charge instruction that instructs to charge the device battery is performed according to an operation of the input device by the user of the vehicle 10, the HMI 60 outputs the information showing the instruction (hereinafter, referred to as "charge instruction information") to the battery information providing device 100. The HMI 60 is an example of "the information output part" in the claims.

The battery information providing device 100 adds the other device connected to the vehicle 10 to supply destinations of electric power when the charge instruction information expressing that charging of the device battery is to be performed is output by the HMI 60. Accordingly, the controller 36 supplies electric power of the battery 40 for traveling to the device battery.

[Configuration of Battery Information Providing Device 100]

Figure 2:
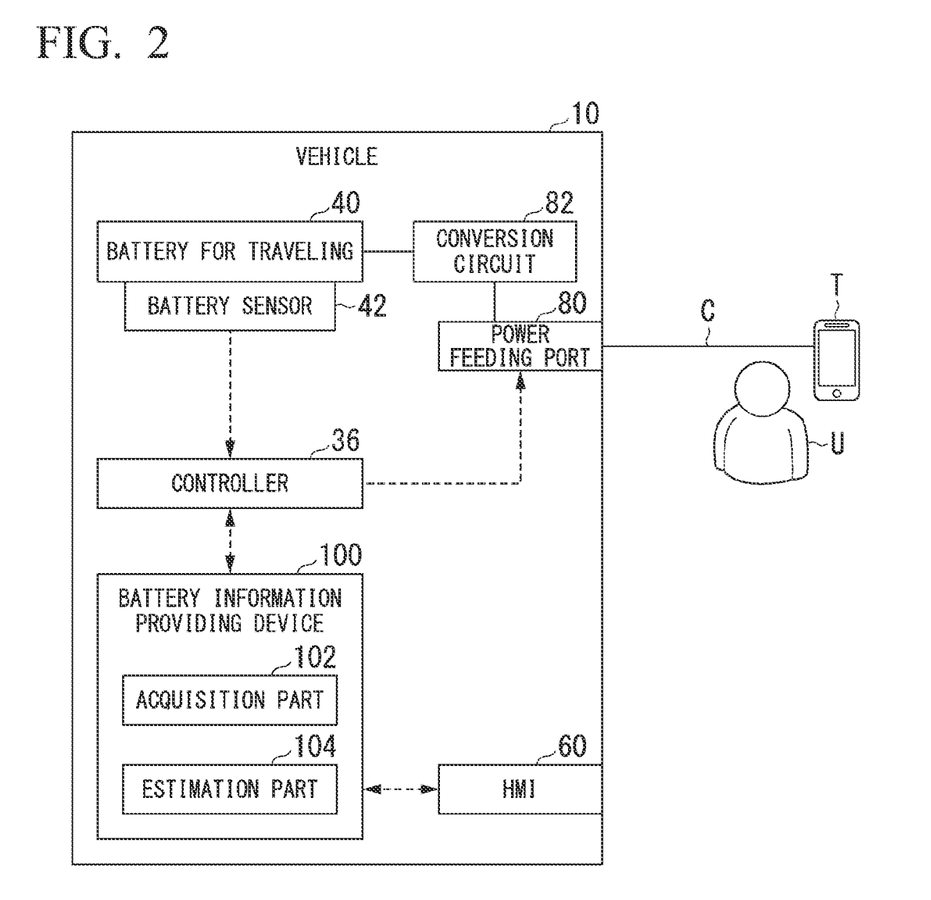
FIG. 2 is a view showing an example of a configuration and a use environment of the battery information providing device according to the first embodiment.

Next, an example of a configuration of the battery information providing device 100 will be described. FIG. 2 is a view showing an example of a configuration and a use environment of the battery information providing device 100 according to the first embodiment. The battery information providing device 100 shown in FIG. 2 includes, for example, an acquisition part 102 and an estimation part 104.

In the example of FIG. 2, a terminal device such as a smartphone, a tablet terminal, or the like, carried by a user of a user terminal T (hereinafter, referred to as "a user U") is connected to the power feeding port 80 of the vehicle 10 by a cable C.

The acquisition part 102 acquires the SOC before supply of the electric power output from the controller 36. In addition, the acquisition part 102 acquires the device battery information from the HMI 60. Here, it is assumed that at least the information of the electric power capacity of the device battery is input by the user U, and the information of the current SOC is input if possible. The acquisition part 102 outputs the SOC before supply of the electric power and the device battery information that were acquired to the estimation part 104.

The estimation part 104 calculates (estimates) the SOC after supply of the electric power on the basis of the SOC before supply of the electric power and the device battery information that were output from the acquisition part 102. The estimation part 104 calculates the SOC after supply of the electric power, for example, when the charge is performed until the state of charge of the device battery becomes a fully charged state. The estimation part 104 calculates the SOC after supply of the electric power while assuming that the current SOC of the device battery is 0 [%] when the SOC after supply of the electric power is calculated using only the information of the electric power capacity of the device battery, and the estimation part 104 calculates the SOC after supply of the electric power assuming that charging with electric power is performed to an extent of a capacity not being charged among the electric power capacity of the device battery when the information of the current SOC of the device battery is obtained. In the case of the latter, the SOC after supply of the electric power can be calculated (estimated) accurately. In addition, when the information expressing the deterioration state of the device battery is acquired as the device battery information by the acquisition part 102, the estimation part 104 further calculates an extent of a decrease of the electric power capacity due to deterioration on the basis of the information expressing the deterioration state of the device battery, and subtracts the calculated extent of the electric power capacity from the electric power capacity of the device battery. Accordingly, the SOC after supply of the electric power can be calculated by obtaining the electric power required for the charging more accurately.

The estimation part 104 outputs the calculated (estimated) information of the SOC after supply of the electric power to the HMI 60 as the battery-related information, and displays the output information on the display device included in the HMI 60. Accordingly, the user U can check the SOC displayed on the display device included in the HMI 60 after supply of the electric power.

The estimation part 104 may calculate (estimate) various variables related to use of the battery 40 for traveling regarding the state of the battery 40 for traveling after the electric power has been supplied to the device battery, in addition to the SOC after supply of the electric power. For example, the estimation part 104 may calculate (estimate) a traveling distance over which the vehicle 10 will be able to travel, or a time (a usable time) over which an in-vehicle device (for example, an air conditioning system such as an air conditioner or the like) included in the vehicle 10 will be able to be used in a state with an SOC after supply of the electric power. In addition, the estimation part 104 may calculate (estimate) a time (an electric power suppliable time) in which electric power can be supplied to the outside of the vehicle 10 when the other device is connected to the power feeding port 80 of the vehicle 10. Further, items when the battery 40 for traveling is used in a state in which the estimation part 104 has became the SOC after supply of the electric power are not limited to the above-mentioned items. The estimation part 104 outputs the battery-related information including also information of calculated (estimated) items, in addition to the SOC after supply of the electric power, to the HMI 60, and displays the output information on the display device included in the HMI 60.

After that, the battery information providing device 100 instructs the controller 36 to supply the electric power to the power feeding port 80 when the user U instructs to start the charge. Accordingly, the controller 36 supplies the electric power of the battery 40 for traveling to the power feeding port 80, and the device battery included in the user terminal T connected to the power feeding port 80 is charged.

[Example of Screen Providing Battery-related Information]

Figure 3:
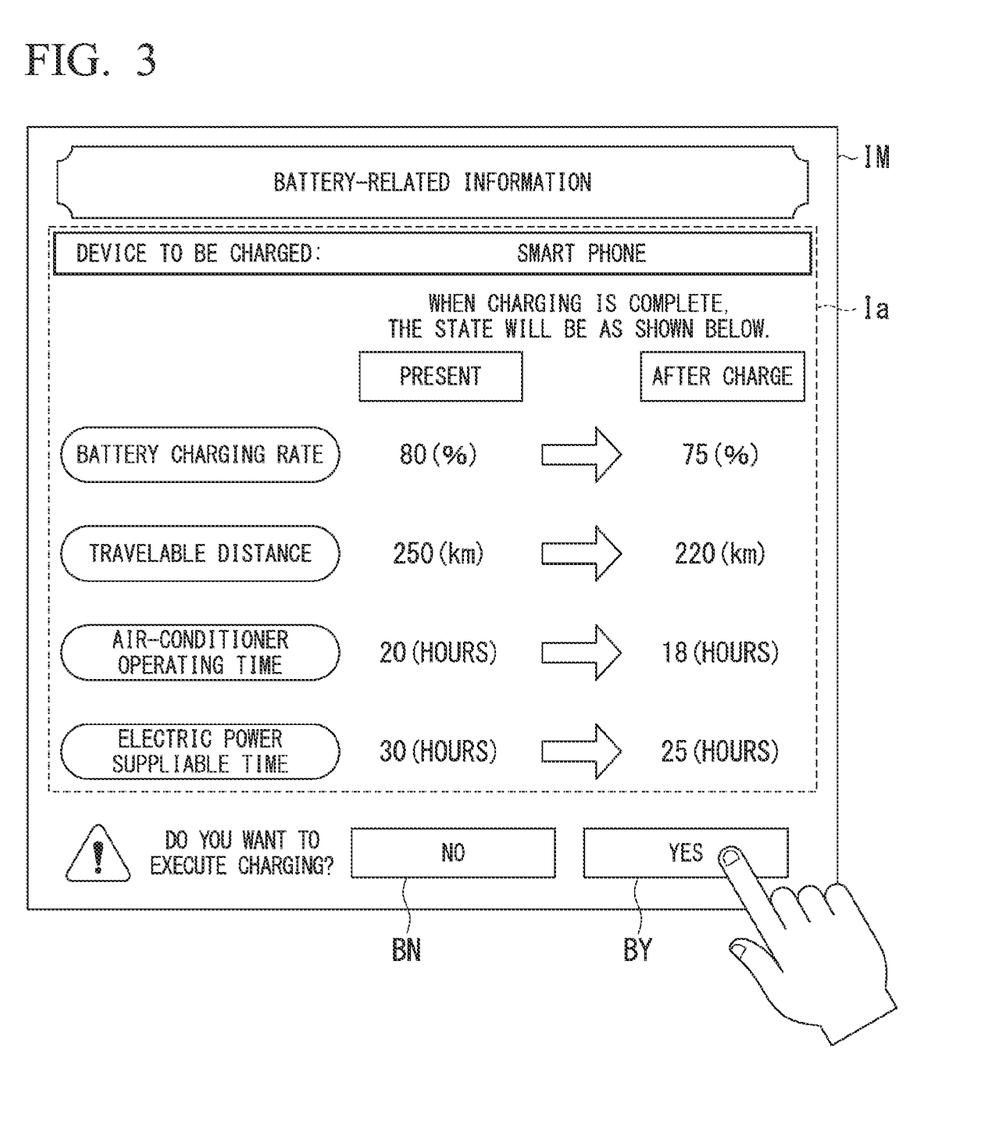
FIG. 3 is a view showing an example of a screen that provides battery-related information estimated by the battery information providing device.

Here, an example of the screen providing the battery-related information calculated (estimated) in the battery information providing device 100 (more specifically, the estimation part 104) to the user U will be described. FIG. 3 is a view showing an example of a screen IM providing the battery-related information estimated (calculated) by the battery information providing device 100. The battery information providing device 100 displays the screen IM shown in FIG. 3 on the display device such as an in-vehicle navigation device or the like, and provides the screen IM to the user U. In FIG. 3, an example of the screen IM is shown which provides the battery-related information and which prompts input of an instruction (input of a charging instruction) regarding whether charging of the user terminal T is to be performed after confirming the provided battery-related information.

In the screen IM shown in FIG. 3, the information showing the user terminal T (in FIG. 3, a smart phone) connected to the power feeding port 80 and the battery-related information are provided in a display area Ia in which the battery-related information is displayed. As the items related to the battery-related information provided in the display area Ia, "the battery charging rate (SOC)," "the travelable distance," "the air conditioner operating time" and "the electric power suppliable time" are shown. "The current" value shown in the items is the SOC before supply of the electric power of the battery 40 for traveling acquired from the controller 36 by the acquisition part 102 or the value calculated (estimated) in a state of the SOC before supply of the electric power by the estimation part 104, and the value "after charge" is the SOC after supply of the electric power calculated (estimated) by the estimation part 104 or the value calculated (estimated) by the estimation part 104 in the state of the SOC after supply of the electric power.

Further, in the screen IM shown in FIG. 3, a button BN and a button BY configured to input an instruction whether the user U performs charge of the user terminal T are provided. The button BN is a button configured to instruct not to charge the user terminal with respect to a question "Do you want to execute charging?" The button BY is a button configured to instruct to charge the user terminal with respect to a question "Do you want to execute charging?" The HMI 60 outputs the charge instruction information showing the instruction to the battery information providing device 100 when the button BY is touched.

[Example of Processing in Battery Information Providing Device 100]

Figure 4:
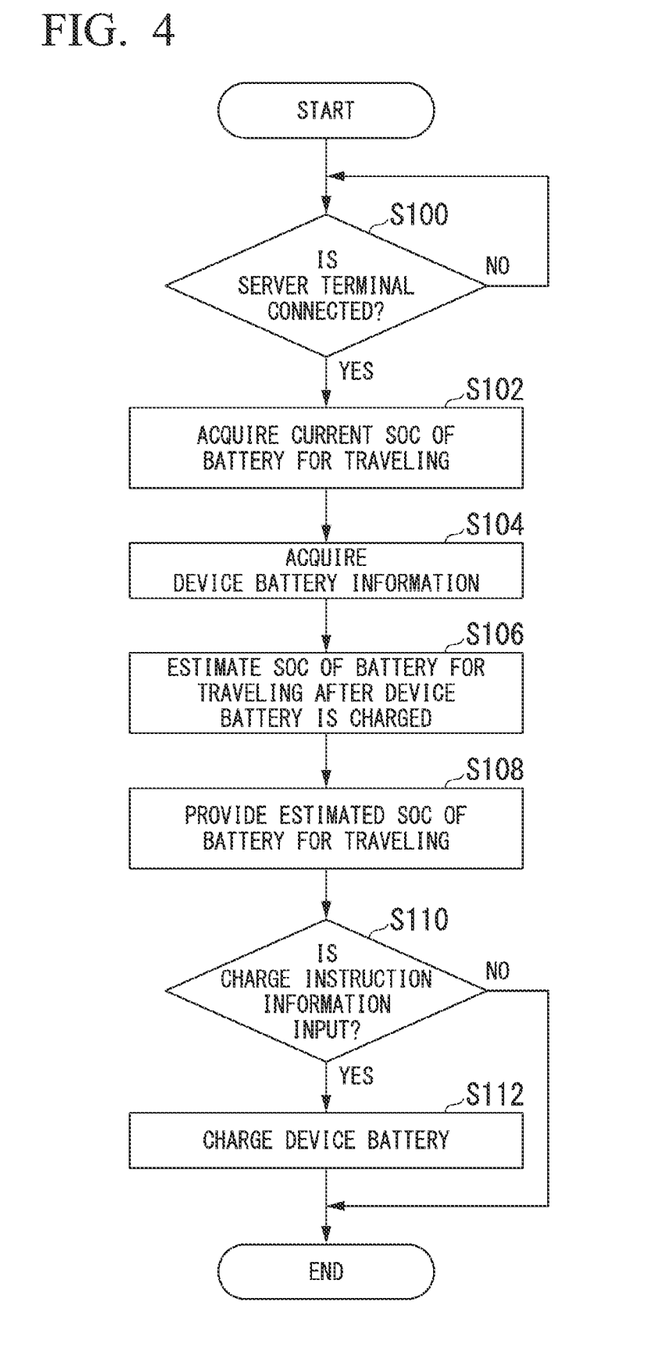
FIG. 4 is a flowchart showing an example of a flow of processing executed by the battery information providing device.

Next, an example of a flow of processing in the battery information providing device 100 will be described. FIG. 4 is a flowchart showing an example of a flow of processing executed by the battery information providing device 100.

First, the battery information providing device 100 checks whether the user terminal T is connected to the power feeding port 80 (step S100). When it is determined that the user terminal T is not connected to the power feeding port 80, the battery information providing device 100 waits until the user terminal T is connected to the power feeding port 80.

When it is checked that the user terminal T is connected to the power feeding port 80 in step S100, the acquisition part 102 included in the battery information providing device 100 acquires the current SOC (the SOC before supply of the electric power) of the battery 40 for traveling from the controller 36 (step S102). For example, the battery information providing device 100 instructs calculation of the SOC before supply of the electric power with respect to the controller 36, and acquires the SOC before supply of the electric power calculated by the controller 36. The acquisition part 102 outputs the acquired SOC before supply of the electric power to the estimation part 104.

Next, the acquisition part 102 acquires the device battery information input from the HMI 60 by the user U (step S104). Here, the battery information providing device 100 may instruct display of the screen that urges input of the device battery information to the HMI 60, and acquire the device battery information output from the HMI 60 after the user U has input with respect to the displayed screen. The acquisition part 102 outputs the acquired device battery information to the estimation part 104.

Next, the estimation part 104 calculates (estimates) the SOC after supply of the electric power on the basis of the SOC before supply of the electric power and the device battery information output from the acquisition part 102 (step S106). Then, the estimation part 104 outputs the information of the calculated (estimated) SOC after supply of the electric power as the battery-related information to the HMI 60, and instructs display of the screen that provides the battery-related information to the HMI 60. Accordingly, for example, the HMI 60 displays the screen IM like the example shown in FIG. 3 on the display device, and provides the battery-related information output from the estimation part 104 to the user U (step S108).

After that, the battery information providing device 100 determines whether the charge instruction information is input from the HMI 60 (step S110). When the charge instruction information is not input, the battery information providing device 100 terminates the processing of the flowchart.

In step S110, when the charge instruction information is input, the battery information providing device 100 instructs the controller 36 to perform supply of the electric power of the battery 40 for traveling to the power feeding port 80. Accordingly, the device battery included in the user terminal T is charged by the electric power supplied by the power feeding port 80 (step S112). Then, the battery information providing device 100 terminates the processing of the flowchart.

As described above, according to the battery information providing device 100 of the first embodiment, when the power feeding port 80 is connected to the user terminal T, the SOC before supply of the electric power and the device battery information of the battery 40 for traveling are acquired, and the SOC after supply of the electric power of the battery 40 for traveling is calculated (estimated) on the basis of the SOC before supply of the electric power and the device battery information that were acquired. Then, according to the battery information providing device 100 of the first embodiment, the battery-related information including the calculated (estimated) SOC after supply of the electric power is provided to the user U. After that, according to the battery information providing device 100 of the first embodiment, after the charge instruction of performing the charge is performed by the user U, charge of the device battery included in the user terminal T is actually started. Accordingly, the user (the user U or the like) of the vehicle 10 in which the battery information providing device 100 of the first embodiment is employed can perceive the state of the battery 40 for traveling after charge of the device battery before the charge of device battery included in the connected user terminal T is performed. Then, the user of the vehicle 10, in which the battery information providing device 100 of the first embodiment is employed, can perform charge of the device battery included in the user terminal T without anxiety while checking that there is no hindrance in traveling of the vehicle 10 or in use of the in-vehicle device hereinafter.

In the first embodiment, the configuration and processing of the battery information providing device 100 have been described as inputting the device battery information to the HMI 60 by the user U. On the other hand or in addition, the device battery information may be acquired by performing direct communication between the communication device 50 and the user terminal T and receiving the device battery information transmitted from the user terminal T. For example, when the user terminal T and the communication device 50 communicate with each other in a wireless manner through, for example, Wi-Fi, Bluetooth (Registered trademark), or the like, the communication device 50 may receive information of an electric power capacity of the device battery transmitted from the user terminal T through direct wireless communication between the user terminal T and the communication device 50, or information of a battery residual amount, i.e., the current SOC of the device battery or the like, as the device battery information. Here, for example, when a deterioration state of the device battery in the user terminal T is managed, the communication device 50 may receive the information of the deterioration state of the device battery transmitted from the user terminal T as the device battery information. In addition, for example, when the power feeding port 80 is a USB terminal, the communication device 50 includes a communication module configured to perform USB communication, and the user terminal T and the power feeding port 80 are connected by the cable C that enables communication by a USB, the communication device 50 may directly acquire the device battery information from the user terminal T through USB communication via the power feeding port 80 and the cable C. When the communication device 50 directly acquires (receives) the device battery information from the user terminal T, the acquisition part 102 acquires each of the device battery information, which is directly acquired (received) from the user terminal T by the communication device 50, from the communication device 50, for example, in step S104.

Second Embodiment

In addition, the device battery information can be acquired from the battery management server device on a network (not shown) in which the communication device 50 manages a state of the battery 40 for traveling mounted in the vehicle 10. Hereinafter, the case will be described.

[Configuration of battery information providing system]

Figure 5:
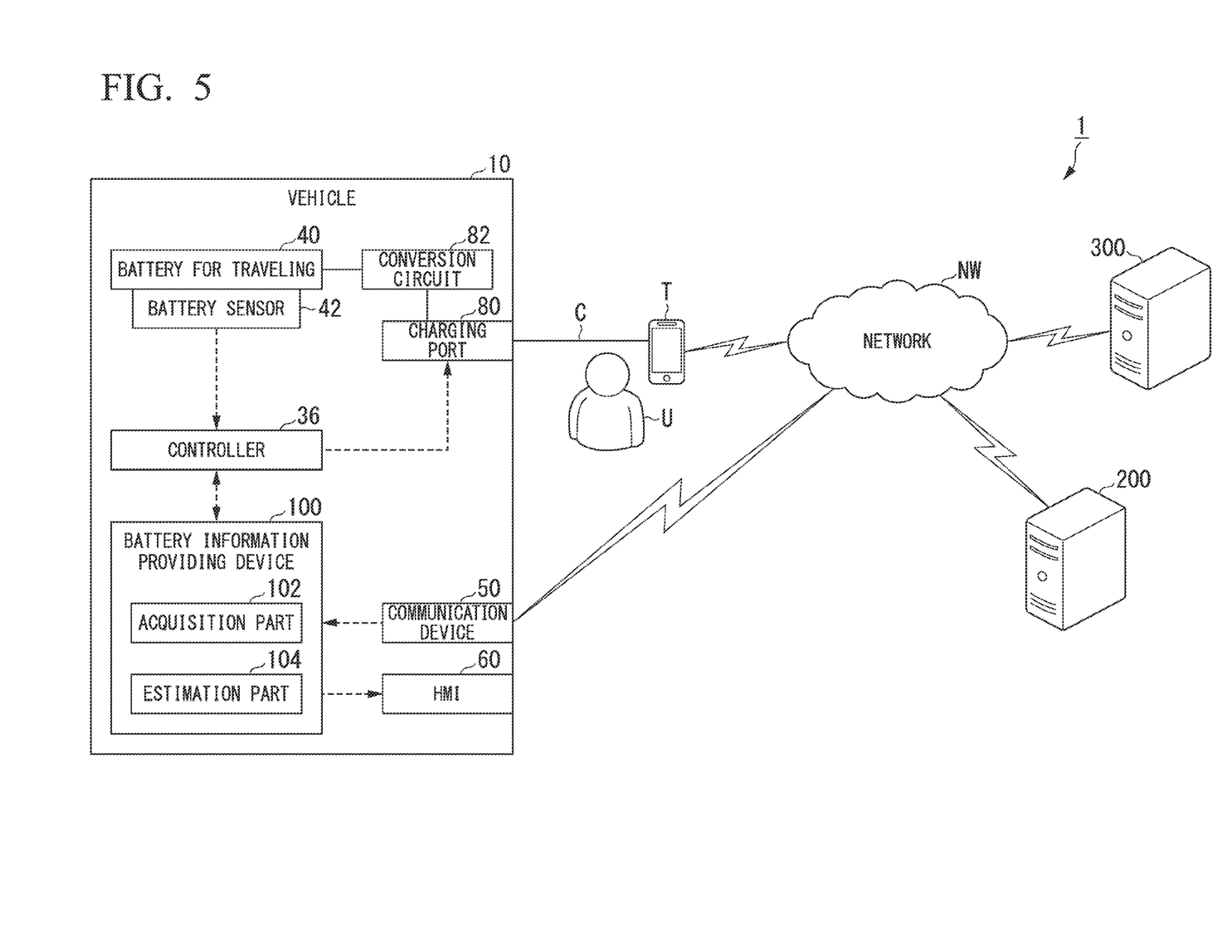
FIG. 5 is a view showing an example of a configuration and a use environment of a battery information providing system according to a second embodiment.

Next, an example of the battery information providing system including the battery information providing device 100 and the server device will be described. FIG. 5 is a view showing an example of a configuration and a use environment of a battery information providing system 1 according to a second embodiment. The battery information providing system 1 shown in FIG. 5 includes, for example, the battery information providing device 100 employed in the vehicle 10, a battery management server device 200, and a device management server device 300.

Even in the example of FIG. 5, the user terminal T is connected to the power feeding port 80 of the vehicle 10 by the cable C. In the battery information providing system 1 shown in FIG. 5, the battery information providing device 100 acquires the device battery information related to the device battery included in the user terminal T through wireless communication by the communication device 50.

The communication device 50 and the battery management server device 200 communicate with each other via a network NW. In addition, the user terminal T and the device management server device 300 communicate with each other via the network NW. In the battery information providing system 1, the battery management server device 200 and the device management server device 300 also communicate with each other via the network NW. The network NW is a communication network for wireless communication including, for example, the Internet, a wide area network (WAN), a local area network (LAN), a provider device, a radio base station, or the like.

The battery management server device 200 communicates with the communication device 50 of the vehicle 10, and manages, for example, a state (a charge state, a deterioration state, or the like) of the battery 40 for traveling mounted in the vehicle 10 on the basis of the communication result. The plurality of battery management server devices 200 may be present on the network NW. However, even when the plurality of battery management server devices 200 are present on the network NW, the battery management server device 200 corresponding to the vehicle 10 is one of the battery management server devices 200, or is operated as the one battery management server device 200.

The user terminal T transmits the information required to manage the device battery by the device management server device 300 to the device management server device 300. The information required to manage the device battery by the device management server device 300 may include, for example, information such as a battery residual amount or the like displayed on the display device included in the user terminal T. In addition, the information required to manage the device battery by the device management server device 300 may include, for example, a physical quantity used to determine (diagnose) the current SOC or the deterioration state of the device battery, such as a current, a voltage, a temperature, or the like.

In the user terminal T, for example, an application and the like are executed which performs transmission and reception of information used to automatically manage the state of the device battery by the device management server device 300 (hereinafter, referred to as "a battery management application"). Then, the battery management application transmits information required to manage the device battery by the device management server device 300 at a predetermined timing. In addition, when the user terminal T is connected to the vehicle 10 by the user U, the battery management application notifies that. For this reason, information regarding the vehicle 10, which is connected to the device battery so as to charge the device battery included in the user terminal T (hereinafter, referred to as "vehicle information"), is previously set in the battery management application. The vehicle information includes, in addition to the information such as a maker, a vehicle type, or the like, of the vehicle 10, for example, information that specifies the vehicle 10 (hereinafter, referred to as "vehicle specifying information"). As the vehicle specifying information, various types of information of specifying the vehicle 10, for example, a chassis number, a car identification plate (what is called, a number plate), or the like, of the vehicle 10 are considered.

Further, the battery management application may include a function of automatically inputting the device battery information which the user U inputs to the HMI 60, for example, information of the electric power capacity of the device battery, information of the battery residual amount, or the like. In this case, the user terminal T can transmit the device battery information to the battery information providing device 100 without requiring an operation by the user U.

The device management server device 300 manages a state of the device battery included in the user terminal T on the basis of the information acquired through communication from the user terminal T. More specifically, the device management server device 300 manages information (including the device battery information) used to calculate (estimate) the SOC after supply of the electric power when the user terminal T is connected to the vehicle 10, for example, a rated value such as an electric power capacity or the like of the device battery, a charge state of the device battery (i.e., the current SOC of the device battery), a deterioration state of the device battery, or the like. For example, when a physical quantity such as a current, a voltage, a temperature, or the like is received as information required to manage the device battery, the device management server device 300 performs calculation of the current SOC of the device battery or diagnosis of the deterioration state on the basis of the received physical quantity, and manages the results thereof. Further, the plurality of device management server devices 300 may be present on the network NW. However, even when the plurality of battery management server devices 300 are present on the network NW, the battery management server device 300 corresponding to the user terminal T is one of the battery management server devices 300, or is operated as the one battery management server device 300.

When the battery information providing device 100 has confirmed that the user terminal T is connected to the power feeding port 80, the communication device 50 requests with respect to the battery management server device 200 for a transmission of the device battery information of the user terminal T connected to the vehicle 10, and receives the information. The battery management server device 200 acquires the device battery information of the user terminal T connected to the vehicle 10 from the device management server device 300 according to requests from the communication device 50, and transmits the information to the communication device 50. The communication device 50 receives the device battery information from the battery management server device 200 and outputs the received information to the battery information providing device 100. The battery information providing device 100 calculates (estimates) the SOC after supply of the electric power of the battery 40 for traveling using the device battery information input from the communication device 50.

[Example of Flow of Entire Processing of Battery Information Providing System]

Figure 6:
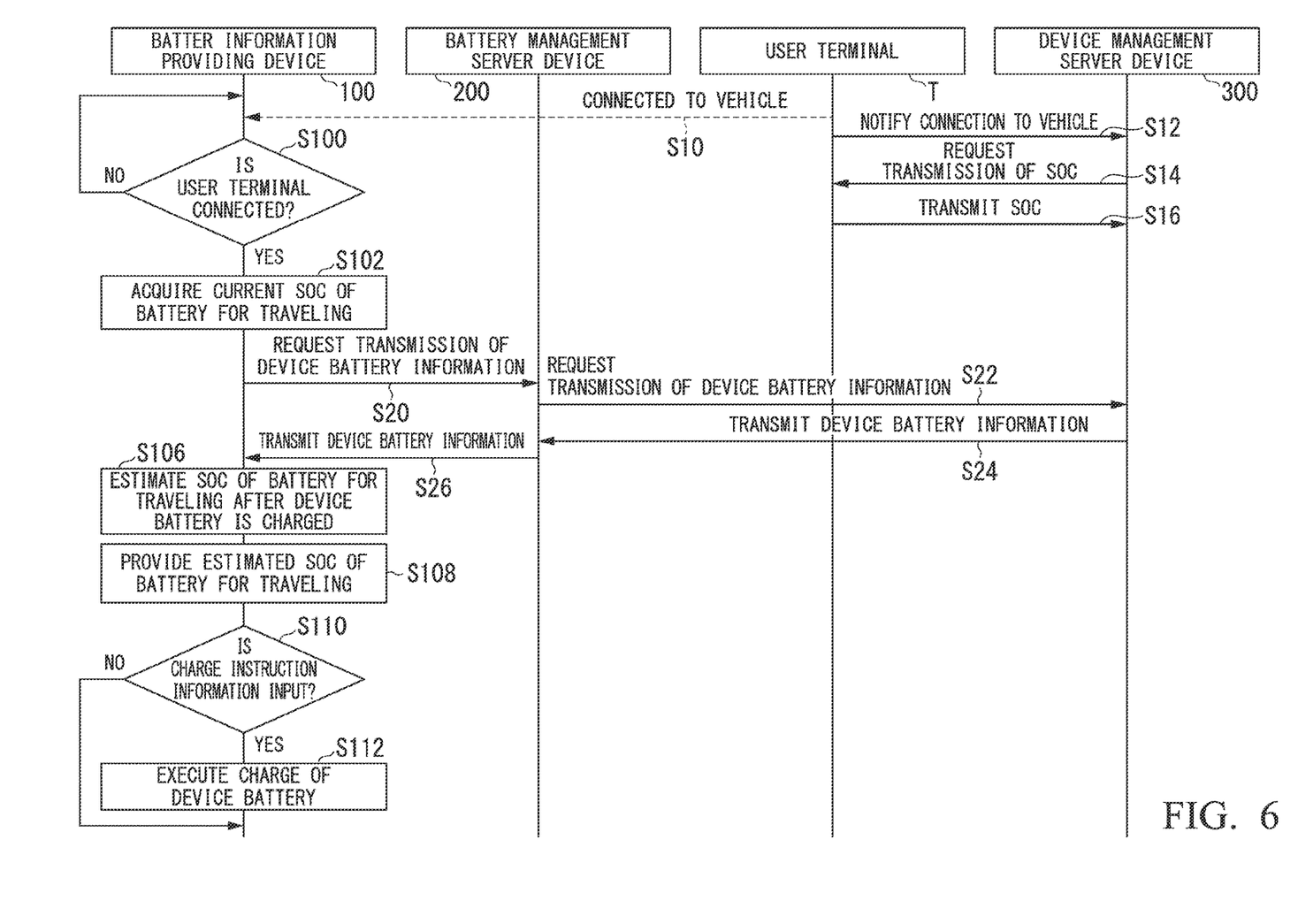
FIG. 6 is a sequential diagram showing an example of the entire flow of the processing executed by the battery information providing system.

Next, an example of the entire flow in the battery information providing system 1 will be described. FIG. 6 is a sequential diagram showing an example of the entire flow of processing executed by the battery information providing system 1.

In the following description, the battery management application in the user terminal T is executed, and various operations are controlled.

The user U connects the user terminal T to the power feeding port 80 of the vehicle 10 (step S10). The battery management application notifies (transmits) that the user terminal T has been connected to the vehicle 10 together with the vehicle information including the vehicle specifying information with respect to the device management server device 300 (step S12).

When the device management server device 300 receives the notice and vehicle information transmitted by the user terminal T are received, the device management server device 300 transmits the SOC requesting signal that is for requesting a transmission of the current SOC of the device battery included in the user terminal T with respect to the user terminal T (step S14). When the battery management application receives the SOC requesting signal transmitted from the device management server device 300, the battery management application transmits the information of the current charge state (the current SOC) of the device battery to the device management server device 300 (step S16). Further, the processing of step S16 in the battery management application may be performed simultaneously with the processing of step S12. That is, the battery management application may also transmit the information of the current SOC of the device battery when the notification, which notifies the user terminal T has been connected to the vehicle 10, and the vehicle information are transmitted to the device management server device 300. In this case, the processing of step S14 in the device management server device 300 may not be performed.

Meanwhile, the battery information providing device 100 checks whether the user terminal T is connected to the power feeding port 80 in step S100. When it is confirmed by the battery information providing device 100 that the user terminal T is connected to the power feeding port 80, the acquisition part 102 acquires the SOC before supply of the electric power from the controller 36 in step S102. The acquisition part 102 outputs the acquired SOC before supply of the electric power to the estimation part 104.

Next, the acquisition part 102 acquires the device battery information from the communication device 50. The acquisition processing of the device battery information from the communication device 50 in the acquisition part 102 is as follows.

First, the acquisition part 102 instructs the communication device 50 to acquire the device battery information. Accordingly, the communication device 50 requests transmission of the device battery information with respect to the battery management server device 200 (step S20). More specifically, the communication device 50 transmits the information requesting signal that requests the device battery information and the identification information that identifies the vehicle 10 to the battery management server device 200. The identification information of the vehicle 10 may be, for example, identification information (for example, a battery ID) of the battery 40 for traveling used when the battery management server device 200 manages a state of the battery 40 for traveling included in the vehicle 10.

The battery management server device 200 requests transmission of the device battery information of the device battery included in the user terminal T connected to the vehicle 10 with respect to the device management server device 300 on the network NW when the information requesting signal transmitted from the vehicle 10 (more specifically, the communication device 50) and the identification information of the vehicle 10 are received (step S22). More specifically, the battery management server device 200 transmits the battery information requesting signal that requests the device battery information and the identification information of the vehicle 10 to the device management server device 300. Further, when the identification information of the vehicle 10 received by the battery management server device 200 is the battery ID, the battery management server device 200 converts the received battery ID into the identification information of the vehicle 10 in which the battery 40 for traveling having the battery ID is mounted, and transmits the converted identification information of the vehicle 10 to the device management server device 300 together with the battery information requesting signal.

When the battery information requesting signal and the identification information of the vehicle 10 transmitted from the battery management server device 200 are received by the device management server device 300, the device management server device 300 specifies the user terminal T to which the device battery information was requested by the battery management server device 200 with reference to the received identification information of the vehicle 10 and the vehicle information which was transmitted from the user terminal T to which the connection to the vehicle 10 is notified. Then, the device management server device 300 transmits the device battery information of the specified user terminal T to the battery management server device 200 that requested (step S24). The device battery information includes the current SOC acquired from the user terminal T by the device management server device 300 in the processing of step S14 and step S16.

Further, the device management server device 300 may not perform the processing (processing of step S12 to step S16) of acquiring the current SOC of the device battery at the timing after the notification of the connection of the user terminal T to the vehicle 10, and may perform processing of acquiring the current SOC of the device battery after the user terminal T to which the device battery information was requested is specified. In this case, the device management server device 300 receives the information of the current SOC of the device battery transmitted by the battery management application in the process of acquiring the current SOC of the device battery, which is performed after the device battery information is requested by the battery management server device 200, and then, transmits the device battery information including the received current SOC to the battery management server device 200 in step S24.

When the battery management server device 200 receives the device battery information transmitted from the device management server device 300, the battery management server device 200 transmits the received device battery information to the vehicle 10 (more specifically, the communication device 50) (step S26). When the communication device 50 receives the device battery information transmitted from the battery management server device 200, the communication device 50 outputs the received device battery information to the acquisition part 102. Accordingly, the acquisition part 102 acquires the device battery information from the communication device 50, and outputs the acquired device battery information to the estimation part 104.

Then, in the battery information providing device 100, the estimation part 104 calculates (estimates) the SOC after supply of the electric power of the battery 40 for traveling in step S106, and provides the information of the calculated (estimated) SOC after supply of the electric power to the user U as the battery-related information in step S108.

After that, the battery information providing device 100 determines whether the charge instruction information is input from the HMI 60 in step S110, instructs the controller 36 to supply the electric power of the battery 40 for traveling to the power feeding port 80 in step S112 when the charge instruction information is input, and charges the device battery included in the user terminal T.

As described above, according to the battery information providing system 1 of the second embodiment, when the user terminal T is connected to the power feeding port 80, the battery information providing device 100 acquires the SOC before supply of the electric power of the battery 40 for traveling, and acquires the device battery information from the battery management server device 200 via the network NW. Then, the battery information providing device 100 calculates (estimates) the SOC after supply of the electric power of the battery 40 for traveling on the basis of the SOC before supply of the electric power and the device battery information, which were acquired. Then, according to the battery information providing system 1 of the second embodiment, after the battery information providing device 100 provides the battery-related information including the calculated (estimated) SOC after supply of the electric power to the user U and a charge instruction to perform the charge is provided by the user U, the charge of the device battery included in the user terminal T is actually started. Accordingly, the user (the user U or the like) of the vehicle 10 in which the battery information providing system 1 of the second embodiment is employed can perceive the state of the battery 40 for traveling after the device battery is charged before the charge of the device battery included in the connected user terminal T is performed. Then, the user of the vehicle 10 in which the battery information providing system 1 of the second embodiment is employed can perform the charge of the device battery included in the user terminal T without anxiety while confirming that there is no hindrance in traveling of the vehicle 10 or in use of the in-vehicle device hereinafter.

In the second embodiment, the battery information providing device 100 may acquire the device battery information from the device management server device 300 without going through the battery management server device 200. In this case, for example, the battery information providing device 100 requests transmission of device battery information to the device management server device 300 in the same processing as that of step S20. Then for example, the device management server device 300 transmits the device battery information to the battery information providing device 100 according to requests from the battery information providing device 100 in the same processing as that of step S24. Further, a flow of the processing between the battery information providing device 100 and the device management server device 300 in this case can be easily understood with reference to an example of the entire flow in the battery information providing system 1 shown in FIG. 6. For this reason, detailed description related to the flow of the processing of the components when the battery information providing device 100 acquires the device battery information from the device management server device 300 will be omitted.

In the second embodiment, when the other device (for example, a note PC) that cannot use a cellular network is connected to the power feeding port 80 of the vehicle 10, it is assumed that the information of the device battery included in the other device is not managed by the device management server device 300. In this case, a case can be considered that the other device (for example, the user terminal T) that can use the cellular network acquires the information of the device battery from the other device that cannot use the cellular network and transmits the acquired information to the device management server device 300. More specifically, when the other device that cannot use the cellular network is a note PC, it can be considered that the battery management application executed in the user terminal T acquires the device battery information related to the device battery included in the note PC from the note PC through wireless communication such as Wi-Fi, a Bluetooth (Registered trademark), or the like, and transmits the acquired information to the device management server device 300. Similarly even in this case, it is possible to perceive the state of the battery 40 for traveling after the electric power of the battery 40 for traveling is supplied to the note PC. Further, in the flow of the processing of these components in this case, while the processing of transmitting and receiving the device battery information between the user terminal T and the note PC through wireless communication are added when the battery information providing device 100 acquires the device battery information, the other processing can be easily understood as being considered in the same manner. For this reason, like the case in which the device battery information of the device battery included in the above-mentioned note PC is acquired by the user terminal T, the configuration in the case in which the device battery information of the device battery included in a device which is an object to be supplied with the electric power is acquired in conjunction with the plurality of the other devices or detailed description related to the flow of the processing of these components will be omitted.

According to the battery information providing device of the above-mentioned embodiment, since the acquisition part 102 configured to acquire the battery charging rate (the SOC before supply of the electric power) of the battery 40 for traveling mounted in the vehicle 10 and in which electric power for traveling is stored and the device battery information related to the device battery included in the device (here, the user terminal T) which is the object to be supplied with the electric power connected to the vehicle 10, and the estimation part 104 configured to estimate the state of the battery 40 for traveling (for example, the SOC after supply of the electric power) after the electric power stored in the battery 40 for traveling has been supplied to the device battery on the basis of the SOC before supply of the electric power and the device battery information and configured to output (display) the battery-related information (for example, the SOC after supply of the electric power) related to the estimated state of the battery 40 for traveling to the information output part (here, the display device included in the HMI 60) are provided, for example, the user of the vehicle 10 such as a driver or the like (may be the user U of the user terminal T) can perceive the state of the battery 40 for traveling after the electric power stored in the battery 40 for traveling mounted in the vehicle 10 has been supplied to the device which is the object to be supplied with the electric power (after the device battery included in the user terminal T is charged). Accordingly, the user of the vehicle 10 in which the battery information providing device 100 or the battery information providing system 1 is employed can perform the charge of the device battery included in the user terminal T without anxiety while confirming that there is no hindrance in traveling of the vehicle 10 or in use of the in-vehicle device hereinafter. In other words, in the vehicle 10 in which the battery information providing device 100 or the battery information providing system 1 is employed, for example, it is possible to prevent a situation in which the battery 40 for traveling runs out its electric power during traveling and the vehicle 10 cannot continue traveling.

The above-mentioned embodiment can be expressed as follows.

A battery information providing device comprising:
a hardware processor; and
a storage device in which a program is stored,
wherein, as the hardware processor reads and executes a program stored in the storage device, the battery information providing device is configured to
acquire a battery charging rate of a battery, which is mounted on a vehicle and which stores electric power for traveling the vehicle, and device battery information related to a device battery which is included in a device, which is an object to which the electric power is supplied, connected to the vehicle,
estimate a state of the battery after the electric power stored in the battery has been supplied to the device battery on the basis of the battery charging rate and the device battery information, and
output battery-related information related to the estimated state of the battery to an information output part.

Further, in the embodiment, the case in which the vehicle 10 in which the battery information providing device is employed is the BEV has been described. However, the electric automobile is, for example, a hybrid electric automobile (HEV) or the like that travels using an electric motor (electric motor) driven by electric power supplied according to an operation of an internal combustion engine such as an engine or the like operated by fuel or electric power supplied from a battery (a secondary battery) for traveling. For this reason, the battery information providing device or the battery information providing system may also be employed in such a hybrid electric automobile. Also similarly in this case, it is possible to perceive the state of the battery after the electric power stored in the battery is supplied to the device which is the object to be supplied with the electric power. Further, a flow of processing in the battery information providing device or the battery information providing system employed in the hybrid electric automobile can be easily understood as being similarly considered as the flow of the processing in the battery information providing device or the battery information providing system employed in the BEV according to the above-mentioned embodiment. For this reason, detailed description related to the flow of the processing in the battery information providing device or the battery information providing system employed in the hybrid electric automobile will be omitted.

In addition, for example, there is also an electrically driven vehicle that travels using an electric motor driven by electric power supplied from a fuel cell, for example, a fuel cell vehicle (FCV) or the like. The battery information providing device or the battery information providing system may also be employed in the fuel cell vehicle. In this case, the battery described in the embodiment is replaced with a fuel cell. Then, the SOC before supply of the electric power or the SOC after supply of the electric power described in the embodiment is replaced with a residual amount of fuel (for example, hydrogen or the like) consumed to supply electric power from the fuel cell. For this reason, the SOC before supply of the electric power acquired by the acquisition part included in the battery information providing device is the current residual amount of the fuel, and the SOC after supply of the electric power calculated (estimated) by the estimation part included in the battery information providing device is a residual amount of the fuel after the device battery included in the device of the connected power feeding object is charged. However, a flow of processing in the battery information providing device or the battery information providing system employed in the fuel cell vehicle can be easily understood as being similarly considered as the flow of the processing in the battery information providing device or the battery information providing system employed in the BEV according to the above-mentioned embodiment. For this reason, detailed description related to a flow of processing in the battery information providing device or the battery information providing system employed in the fuel cell vehicle will be omitted.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A battery information providing device that is mounted on a vehicle and that is configured to provide information related to a battery which is mounted on the vehicle and which stores electric power for traveling the vehicle, the battery information providing device comprising:
    an acquisition part that is configured to acquire a battery charging rate of the battery in a case where a device which is an object to be supplied with the electric power is connected to a power feeding port of the vehicle, and that is configured to acquire device battery information related to a device battery included in the device which is the object to be supplied with the electric power by (i) an input of the device battery information from an user of the device which is the object to be supplied with the electric power, (ii) receiving the device battery information from a battery management server device that is configured to manage a usage of the battery in the vehicle, (iii) receiving the device battery information from the device which is the object to be supplied with the electric power, or (iv) receiving the device battery information from a device management server device configured to manage the device battery information transmitted from the device which is the object to be supplied with the electric power; and
    an estimation part that is configured to calculate a state of the battery after the electric power has been supplied to the device battery in order to charge the device battery on the basis of the battery charging rate and the device battery information, and that is configured to display battery-related information related to the calculated state of the battery in a display device.

2. The battery information providing device according to claim 1, wherein the estimation part calculates a battery charging rate of the battery after the electric power has been supplied to the device battery in order to charge the device battery as the state of the battery.

3. The battery information providing device according to claim 1, wherein the estimation part calculates a traveling distance, which is a distance over which the vehicle is able to travel with a stored electric power in the battery after the electric power has been supplied to the device battery, and displays the calculated result of the traveling distance as the battery-related information in the display device.

4. The battery information providing device according to claim 1, wherein the estimation part calculates a usable time, which is a time length in which an in-vehicle device included in the vehicle is usable with a stored electric power in the battery after the electric power has been supplied to the device battery, and displays the calculated result of the usable time as the battery-related information in the display device.

5. The battery information providing device according to claim 1, wherein the estimation part calculates an electric power suppliable time, which is a time length over which a stored electric power in the battery after the electric power has been supplied to the device battery is able to be supplied to an outside of the vehicle, and displays the calculated result of the electric power suppliable time as the battery-related information in the display device.

6. The battery information providing device according to claim 1, wherein the acquisition part acquires information related to a capacity of the device battery as the device battery information.

7. The battery information providing device according to claim 6, wherein the acquisition part acquires information related to a battery charging rate of the device battery as the device battery information.

8. The battery information providing device according to claim 6, wherein the acquisition part acquires information related to a deterioration state of the device battery as the device battery information.

9. A battery information providing system comprising:
    the battery information providing device according to claim 1; and
    a battery management server device configured to manage a usage of the battery in the vehicle,
    wherein the battery management server device transmits the acquired device battery information to the battery information providing device, and
    the battery information providing device calculates a state of the battery after the electric power stored in the battery has been supplied to the device battery in order to charge the device battery on the basis of the battery charging rate and the device battery information transmitted from the battery management server device, and displays the battery-related information related to the calculated state of the battery to the information output part in the display device.

10. The battery information providing system according to claim 9, wherein the battery management server device transmits the device battery information, which is acquired from the device management server device configured to manage the device battery information transmitted from the device which is the object to be supplied with the electric power, to the battery information providing device.

11. A battery information providing method, which is performed by a computer of a battery information providing device that is mounted on a vehicle and that is configured to provide information related to a battery which is mounted on the vehicle and which stores electric power for traveling the vehicle, the battery information providing method comprising:

acquiring a battery charging rate of the battery in a case where a device which is an object to be supplied with the electric power is connected to a power feeding port of the vehicle, and acquiring device battery information related to a device battery included in the device which is the object to be supplied with the electric power by (i) an input of the device battery information from an user of the device which is the object to be supplied with the electric power, (ii) receiving the device battery information from a battery management server device that is configured to manage a usage of the battery in the vehicle, (iii) receiving the device battery information from the device which is the object to be supplied with the electric power, or (iv) receiving the device battery information from a device management server device configured to manage the device battery information transmitted from the device which is the object to be supplied with the electric power;

calculating a state of the battery after the electric power has been supplied to the device battery in order to charge the device battery on the basis of the battery charging rate and the device battery information; and displaying battery-related information related to the calculated state of the battery in a display device.

12. A non-transitory computer-readable recording medium, on which a program is stored to cause a computer of a battery information providing device that is mounted on a vehicle and that is configured to provide information related to a battery which is mounted on the vehicle and which stores electric power for traveling the vehicle to:

acquire a battery charging rate of the battery in a case where a device which is an object to be supplied with the electric power is connected to a power feeding port of the vehicle, and acquire device battery information related to a device battery included in the device which is the object to be supplied with the electric power by (i) an input of the device battery information from an user of the device which is the object to be supplied with the electric power, (ii) receiving the device battery information from a battery management server device that is configured to manage a usage of the battery in the vehicle, (iii) receiving the device battery information from the device which is the object to be supplied with the electric power, or (iv) receiving the device battery information from a device management server device configured to manage the device battery information transmitted from the device which is the object to be supplied with the electric power;

calculating a state of the battery after the electric power has been supplied to the device battery in order to charge the device battery on the basis of the battery charging rate and the device battery information; and displaying battery-related information related to the calculated state of the battery in a display device.

* * * * *